United States Patent [19]
Dunne

[11] Patent Number: 5,535,817
[45] Date of Patent: Jul. 16, 1996

[54] SORPTION COOLING PROCESS AND APPARATUS

[75] Inventor: Stephen R. Dunne, Bethel, Conn.

[73] Assignee: UOP, Des Plaines, Ill.

[21] Appl. No.: 462,993

[22] Filed: Jun. 5, 1995

Related U.S. Application Data

[63] Continuation-in-part of Ser. No. 124,740, Sep. 21, 1993, Pat. No. 5,456,093, which is a continuation-in-part of Ser. No. 895,975, Jun. 9, 1992, Pat. No. 5,260,243, which is a continuation-in-part of Ser. No. 386,319, Jul. 28, 1989, Pat. No. 5,120,694.

[51] Int. Cl.$^6$ ..................................... F25B 17/08
[52] U.S. Cl. ..................... 165/104.12; 62/480; 502/527
[58] Field of Search ................. 165/104.12; 502/527; 62/480

[56] References Cited

U.S. PATENT DOCUMENTS

| | | | |
|---|---|---|---|
| 4,034,569 | 7/1977 | Tcherney | 62/2 |
| 4,135,371 | 1/1979 | Kesselring et al. | 165/104.12 |
| 4,138,850 | 2/1979 | Tcherney | 60/64 |
| 4,232,533 | 11/1980 | Lundblad et al. | 62/509 |
| 4,410,028 | 10/1983 | Alefeld et al. | 165/1 |
| 4,484,617 | 11/1984 | Sizmann | 165/104.12 |
| 4,493,364 | 1/1985 | Macriss et al. | 165/104.16 |
| 4,548,046 | 10/1985 | Brandon et al. | 62/79 |
| 4,631,268 | 12/1986 | Lachman et al. | 502/527 |
| 4,637,218 | 1/1987 | Tcherney | 62/106 |
| 4,674,563 | 6/1987 | Maier-Laxhuber et al. | 165/104.12 |
| 4,924,676 | 5/1990 | Maier-Laxhuber et al. | 62/59 |
| 5,054,544 | 10/1991 | Maier-Laxhuber et al. | 165/104.12 |
| 5,214,020 | 5/1993 | Shimada | 502/527 |
| 5,279,359 | 1/1994 | Erickson | 165/104.12 |
| 5,456,093 | 10/1995 | Dunne et al. | 62/480 |

OTHER PUBLICATIONS

S. C. Chang, Roux, J. A., "Thermodynamic Analysis of a Solar Zeolite Refrigeration System", JOURNAL OF SOLAR ENERGY, Aug. 1985, vol. 107 pp. 189–194.

Soon–Haeng Cho et al., "Silica Gel/Water Adsorption–Cooling System" paper presented at Solic Sorption Refrigeration Symposium, Paris France, Nov. 18–20, 1992, pp. 106–110.

Groll, M., "Reaction Beds for Dry Sorption Machines" presented at Solid Sorption Refrigeration Symposium, Paris, France, Nov. 18–20, 1992, pp. 207–214.

Motoyuki Suzuki, "Application of Adsorption Cooling System to Automobiles" Presented at Solid Sorption Refrigeration Symposium, Paris, France, Nov. 18–20, 1992, pp. 136–141.

*Primary Examiner*—John Rivell
*Assistant Examiner*—Christopher Atkinson
*Attorney, Agent, or Firm*—Thomas K. McBride; John G. Tolomei; Richard P. Silverman

[57] ABSTRACT

A desiccant cooling apparatus and process using a solid adsorbent and refrigerant wherein the solid adsorbent is selected from the group consisting of zeolite Y-45 zeolite Y-85, a low cerium rare earth exchanged Y-84 and a rare earth exchanged LZ-210, and the adsorbent is bonded directly to the heat exchange tubes within the device by a novel slip coating process resulted in significant improvements in thermal efficiency and overall performance.

19 Claims, 6 Drawing Sheets

5,535,817

SORPTION COOLING PROCESS AND APPARATUS

CROSS-REFERENCE TO RELATED APPLICATIONS

This application is a continuation-in-part of application Ser. No. 124,740, filed on Sep. 21, 1993, and issued on Oct. 10, 1995 as U.S. Pat. No. 5,456,093 which is a continuation-in-part of application Ser. No. 895,975, filed Jun. 9, 1992, now U.S. Pat. No. 5,260,243 which is a continuation-in-part of application Ser. No. 386,319, filed Jul. 28, 1989 and issued on Jun. 9, 1992 as U.S. Pat. No. 5,120,694 and is herein incorporated by reference.

FIELD OF THE INVENTION

The present invention relates in general to adsorbent composites and more particularly to a process for sorption cooling utilizing an adsorbent-lined tube and to an apparatus useful for sorption cooling.

BACKGROUND OF THE INVENTION

There are a variety of solid adsorbents which have been useful in adsorption and catalysis including commonly known materials such as activated carbons, activated clays, silica gel, activated alumina, and crystalline molecular sieves. Of these adsorbents, crystalline molecular sieves such as silicoalumino phosphates, aluminophosphates and aluminosilicate zeolites have been particularly useful because of their uniform pore size.

In many instances it is desirable to have the solid adsorbent deposited on a substrate as a coating insmad of being contained in particulate form as pellets, beads, or other particles. There are several reasons why solid adsorbent coatings have been used including for example, to improve the catalytic or adsorption properties of the solid adsorbent by improving the surface area to weight ratio, to reduce the amount of solid adsorbent required, to protect the underlying substrate material from a harmful environment, to achieve a particular strength or form, and, to perform the particular adsorptive or catalytic function over the entire coated surface of the substrate.

Despite the diversity of coating methods and end uses known to exist, new methods are sought which can be used to coat the inside surfaces of tubes with solid adsorbents without the use of adsorbent formation reactions, frits and enamels, paints, varnishes and the like, in order to provide adsorbent-substrate composites that have physical and performance properties suitable for sorption cooling use.

Some thermodynamic processes for cooling and heating by adsorption of a refrigerating fluid on a solid adsorbent use zeolite, and other sorption materials such as activated carbon and silica gel. In these processes, the thermal energy from adsorbing zeolite in one place is used to heat desorbing zeolite located in another place. U.S. Pat. No. 4,138,850 relates to a system for such solar heat utilization employing a solid zeolite adsorbent mixed with a binder, pressed, and sintered into divider panels and hermetically sealed in containers. U.S. Pat. No. 4,637,218 relates to systems for a heat pump using zeolite as an adsorbent wherein the zeolite is prepared by slicing natural zeolite rock with a carbide saw, or by pressing slightly-wetted, powdered zeolite into bricks. The bricks used in U.S. Pat. No. 4,637,218 are preferably not more than 10 mm in thickness.

U.S. Pat. No. 4,548,046 relates to an apparatus for cooling or heating by adsorption of a refrigerating fluid on a solid adsorbent. The operations employ a plurality of tubes provided with parallel radial fins filled or covered with solid adsorbent such as Zeolite 13X located on the outside of the tubes.

The thermodynamic aspects of developing a zeolite-water adsorption refrigeration unit are well known. An article entitled, "Thermodynamic Analysis of a Solar Zeolite Refrigeration System," by S. Chang and J. A. Roux, which appeared in the Journal of Solar Energy Engineering, August 1985, Volume 107, pages 189–194 provides a discussion of the main parameters, including adsorber properties.

In adsorber/generator based cooling systems the most significant parameter is the overall heat transfer coefficient between the adsorbent bed and the cooling or heating gases per unit weight of adsorbent in the system. This parameter has been related in the literature to the cooling power per kilogram of adsorbent. The higher the cooling power, the more efficient the adsorber/generator system. Current systems are limited by requiring a high adsorbent regenerator temperature or a long cycle time to achieve relatively low cooling power values.

In a paper titled, "Application of Adsorption Cooling System to Automobiles," by Moloyuki Suzuki, presented at the Solid Sorption Refrigeration Symposium —Paris, France, Nov. 18–20, 1992. Suzuki disclosed the results of a study to particularly point out the technological limits associated with the application of adsorption cooling systems to passenger car air conditioning. Suzuki's model considered an adsorbent bed wherein the adsorption step corresponds to the cooling step where water evaporation takes place at a water container, and wherein regeneration step corresponding to a generation step where the adsorbent bed is heated by exhaust gases to desorb the water. These steps are repeated in series requiring at least two units to achieve continuous cooling. Suzuki suggests the use of "quick cycles with a high overall heat transfer coefficient will result in acceptable designs. Currently, overall heat transfer coefficients in the ranges of 25 to 50 are reported in a paper title, "Reaction Beds for Dry Sorption Machines," by M. Groll and presented at the above mentioned Solid Sorption Refrigeration Symposium. Suzuki predicts a threshold value of 100 kW/m$^3$K (about 150 W/m$^2$K) for overall heat transfer k, m coefficient as a target for the future work, and further points out the need for systems with mechanical strength for use in automobiles, but does not suggest how this value which is greater than 3 times the ability of the current art can be achieved.

Prior methods of using zeolite adsorbents in devices for cooling or heating by adsorption of a refrigerating fluid on a solid adsorbent have been inefficient and difficult to prepare. Those methods of preparation included cutting natural rock into thin bricks and mounting these bricks on to heat exchange surfaces or casting powdered zeolites and mixtures thereof with clays into panels or slabs for direct contact with fluids. Methods are sought to improve the operating efficiency of these devices, and to improve the way in which the solid zeolite adsorbent is employed in these devices.

OBJECTS OF THE INVENTION

It is an object of the instant invention to provide an improved sorption cooling apparatus for use in waste heat recovery and air conditioning systems.

It is a further objective of the instant invention to provide an adsorbent/refrigerant system which provides a high overall efficiency within the limits of typical waste heat recovery and air conditioning cycles.

It is a still further object of the instant invention to provide a sorption cooling cycle with an improved overall thermal efficiency.

SUMMARY OF THE INVENTION

The present invention provides a desiccant cooling apparatus comprising a housing having a first fluid inlet and first fluid outlet and a second fluid inlet and fluid outlet. A plurality of partially zoolite-lined tubes extend substantially longitudinally within the housing. The tubes have a tube surface with a lined surface portion in a first zone at a first end and a bare surface portion in a second zone opposite at a second end and the lined surface portion has an interior surface which is uniformly lined with a zeolite composition. The zeolite composition is bonded directly to an interior surface of the lined surface portion and defines an internal tube space containing a refrigerant. The tubes are aligned in a parallel relationship with each other, spaced to permit transverse fluid flow and sealed at said first end. A header plate is disposed at each of the tubes. The header plates have a plurality of holes for inserting the ends of the tubes and are disposed in sealing contact with the tubes. At least one insulating baffle is disposed at a point between the ends of the tubes. The insulating baffle has a plurality of holes for inserting the tubes therethrough and is aligned generally transverse to the tubes. The insulating baffle is disposed in a sealing contact with the tubes and said housing thereby defining the first zone and the second zone within said housing. The first zone comprising said lined surface portion of said tubes is between the first end and the insulating baffle and is in fluid communication with the first fluid inlet and first fluid outlet for the flow of a first fluid therethrough. The second zone comprising said bare surface portion is between the insulating baffle and the second end. The second zone is in fluid communication with the second fluid inlet and the second fluid outlet for the flow of a second fluid therethrough. An end cap is disposed in sealing contact to the header plate at the second end of the tubes, thus defining a third zone in fluid communication with the interior tube space and a valve disposed on the end cap in fluid communication with the third zone.

In a further embodiment a process for sorption cooling is provided to refrigerate a feedstream from an initial temperature to a lower temperature and comprises a series of sequential steps. A first fluid at a first temperature is passed to a first zone of a desiccant cooling apparatus containing at least one partially zeolite-lined tube. Each tube has a first tube portion having a lined surface portion in the first zone and a second tube portion having a bare surface portion in the second zone of the desiccant cooling apparatus. The partially zeolite-lined tube has a uniform lining comprising zeolite in said first tube portion and an inner tube space containing a refrigerant. A portion of the refrigerant is desorbed from the first tube portion to produce a vaporized refrigerant stream therein. The vaporized refrigerant stream is passed to the second tube portion. Simultaneously, a second fluid at a second temperature is passed to the second zone of the desiccant cooling apparatus to condense the vaporized refrigerant stream within the second tube portion. The above steps are terminated. The second fluid at the second temperature is passed to the first zone to heat the second fluid to a third temperature. Simultaneously, the feedstream at the initial temperature is passed to the second zone and the feedstream is withdrawn at the lower temperature. The passing of the second fluid and the feedstream are terminated and all of the above steps are repeated to provide a sorption cooling cycle. At least one other desiccant cooling apparatus is operated according to the sorption cooling cycle and offset by at least one-half of the sorption cooling cycle to provide continuous cooling of the feedstream. An adsorber/generator cooling system based on the present invention achieves an overall heat transfer coefficient of about 175 $W/m^2/K$, a value which is 15 percent greater than predicted as desirable for use in automotive air conditioners.

DETAILED DESCRIPTION OF THE INVENTION

Figure 1A:
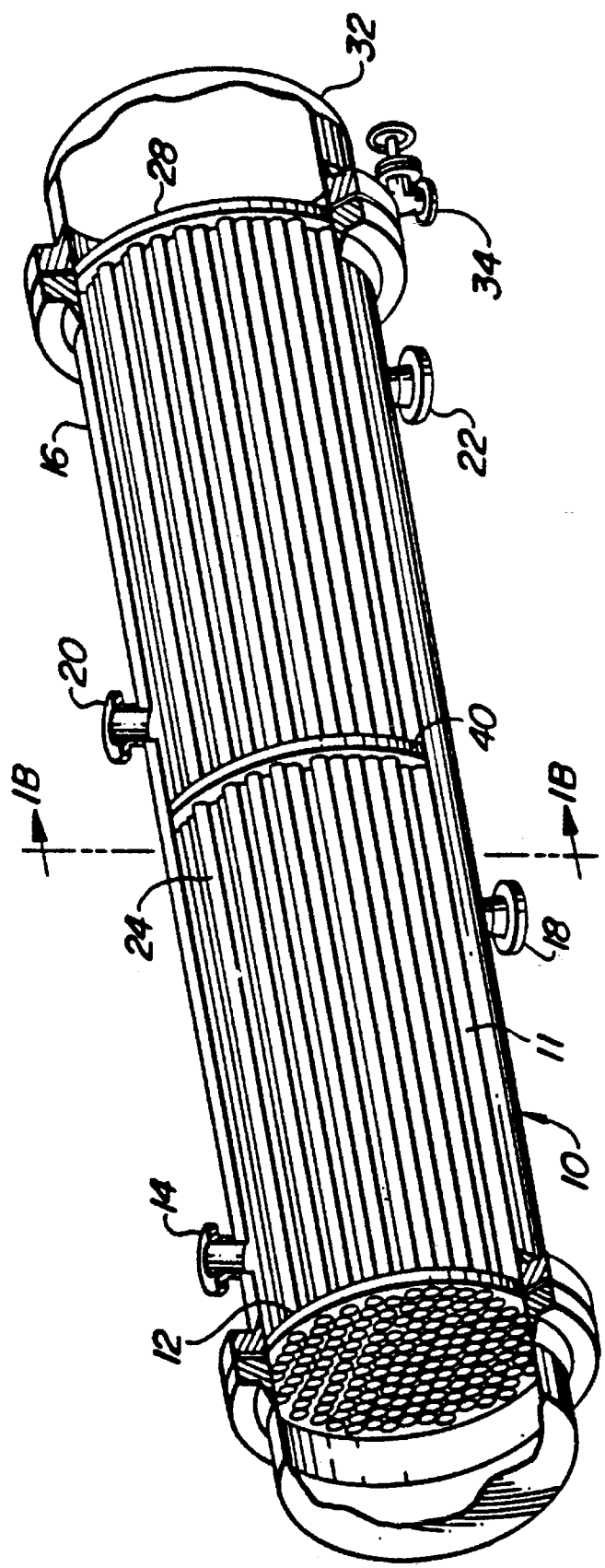
FIG. 1A is a diagrammatic illustration of a sorption cooling apparatus of the present invention for conditioning liquid streams, the housing being partially broken away to show FIG.1B, a detail of the partition between a first and a second zone and FIG. 1C, a detail of FIG. 1B showing cross-section of a partially zeolite-lined tube.

The present invention provides adsorbent-substrate composites and methods for preparing the composites by coating an inside surface of a tube with a layer of solid adsorbent, preferably molecular sieve, and more preferably zeolite. Other aspects of the present invention relate to process for utilizing the adsorbent coatings.

The substrates used in the present invention provide structural support for the solid adsorbent layer as well as provide a suitable bonding medium for the solid adsorbent and binder. The substrate may be, for example, copper, aluminum metal, steel, glass, aluminized ceramic and other similar materials. It is not necessary for the substrate to be chemically treated or washed with solvent in order to practice the present invention, however the substrate should be relatively free from large amounts of foreign matter which may adversely affect bonding, such as dirt or grease.

Virtually any synthetic or naturally occurring solid adsorbent capable of maintaining its physical integrity during the coating process is suitable for use according to the present invention. The selection of the particular solid adsorbent will depend on factors such as its effective pore diameter and the particular end use intended. The term "effective pore diameter" is conventional in the art and is used herein to functionally define the pore size in terms of the size of molecules that can enter the pores rather than actual dimensions which are often difficult to determine as the pores are often irregularly shaped, i.e., non-circular. D. W. Breck, in

*Zeolite Molecular Sieves*, John Wiley and Sons, New York, 1974, at pages 633 to 641, provides a discussion of effective pore diameter which is hereby incorporated by reference.

Although there are a variety of solid adsorbents which are suitable for use according to the present invention including but not limited to activated carbons, activated clays, silica gel, activated alumina and crystalline molecular sieves, molecular sieves are preferred for adsorption and catalysis because of their uniform pore size, i.e., effective pore diameter. These molecular sieves include, for example, the various forms of silicoaluminophosphates, and aluminophosphates disclosed in U.S. Pat. No. 4,440,871, 4,310,440, and 4,567,027, hereby incorporated by reference, as well as zeolitic molecular sieves.

Zeolitic molecular sieves in the calcined form may be represented by the general formula:

$$Me_{2/n}O:Al_2O_3:xSiO_2:yH_2O$$

where Me is a cation, n is the valence of the cation, x has a value from about 2 to infinity and y has a value of from about 2 to 10.

Typical well known zeolites which may be used include, chabazite, also referred to as Zeolite D, clinoptilolite, erionite, faujasite, also referred to as Zeolite X and Zeolite Y, ferrierite, mordenite, Zeolite A, and Zeolite P. Detailed descriptions of the above-identified zeolites, as well as others, may be found in D. W. Breck, *Zeolite Molecular Sieves*, John Wiley and Sons, New York, 1974, hereby incorporated by reference. Other zeolites suitable for use according to the present invention are those having a high silica content, i.e. those having silica to alumina ratios greater than 10 and typically greater than 100. One such high silica zeolite is silicalite, as the term used herein includes both the silicapolymorph disclosed in U.S. Pat. No. 4,061,724 and also the F-silicalite disclosed in U.S. Pat. No. 4,104,294, hereby incorporated by reference.

Zeolites which are preferred for use in the present invention are those zeolites which permit the desorption of water at moderate to low temperatures and have a relatively low heat capacity. Such preferred zeolites may be selected from the group consisting of X and Y zeolites, and more particularly are selected from the group consisting of zeolite Y-54, zeolite Y-85, low cerium exchanged zeolite Y-84 and rare earth exchanged LZ-210. Zeolite Y-85 is a steam stabilized modified zeolite Y the preparation of which is disclosed in U.S. Pat. No. 5,208,197 in column 7, line 16 to column 8 line 40 and is herein incorporated by reference. The low cerium exchanged zeolite Y-84 is prepared in a manner similar to the preparation of Y-85, except that the second ammonium ion exchange is carried out in the conventional manner at a pH well above 4.0 and the resulting zeolite is subjected to a rare earth exchange by contacting the zeolite with an aqueous solution of rare earth salt in the known manner. A mixed rare earth chloride salt can be added to an aqueous slurry of the ammonium exchanged zeolite to yield a zeolite product having a rare earth content generally in the range of 3.5 to 12.0 weight percent rare earth as $RE_2O_3$. The product is then water washed and calcined in dry air at a temperature of from about 55° C. to about 850° C., preferably 600° C. to about 750° C. for a period of time to reduce the unit cell dimension to less than 24.6 Angstrom and more particularly in the range of 24.4 to 24.6 Angstroms. The final low cerium exchanged zeolite Y-84 has a cerium content less than about 0.2 weight percent. Zeolite LZ-210 is defined in a U.S. Pat. No. 4,503,023 in column 12, lines 5–68. The rare earth exchanged zeolite LZ-210 may be prepared by subjecting the LZ-210 to a conventional rare earth exchange step followed by the dry air calcination step described above. U.S. Pat. No. 4,503,023 is hereby incorporated by reference.

For purposes of the present invention it is required that the solid adsorbent be agglomerated with a binder in order to ensure that the coating will have suitable physical properties. Although there are a variety of synthetic and naturally occurring binder materials available such as metal oxides, clays, silicas, aluminas, silica-aluminas, silica-zirconias, silica-thorias, silica-berylias, silica-titanias, silica-alumina-thorias, silica-alumina-zirconias, mixtures of these and the like, clay type binders are preferred. Examples of clays which may be employed to agglomerate the zeolites without substantially altering the adsorptive properties of the zeolite are attapulgite, kaolin, volclay, sepiolite, halloysite, palygorskite, kaolinire, bentonite, montmorillonite, illire and chlorite. A kaolin binder in combination with silica is particularly preferred for practicing the present invention. The addition of a small mount of silica to the binder surprisingly permitted the bonding of the solid adsorbent to high conductivity materials such as copper and steel, as well as aluminized surfaces. The preferred amount of silica in the binder ranges from about 5 to 40 wt. % and more particularly ranges from about 20 to about 30 wt. % of the binder. It is to be understood that certain solid adsorbents, such as activated alumina, can function adequately as both the adsorbent and the binder. Hence, in such a case, it is not necessary to utilize an additional binder. However, it may nonetheless be advantageous to use an additional binder, such as clay, for economic reasons, etc.

According to the present invention the substrate is coated with the solid adsorbent by contacting the surface of the substrate, after heating the surface as hereinafter described, with a slurry comprising the solid adsorbent and binder. The solid particles used in the slurry including both the solid adsorbent and binder material may be of any size functionally suitable in the present invention. However, the solid adsorbent and binder are desirably present as small particles, preferably having a particle size of from about 1 to 500 microns more preferably from about 1 to 50 microns.

If necessary, the solid particles may be subjected to mechanical size reduction, e.g., grinding, crushing, milling and the like, in order to obtain the desired particle size. However, it is preferred that the solid particles be more smooth, and more preferably also more spherical, relative to solid particles of similar composition obtained by mechanical size reduction. Such particle smoothness and sphericity tends to improve evenness of the coating and may also allow increased solids loading in the slurry, if desired. One particularly useful processing step to achieve such smoothness and sphericity is to employ spray drying as part of the said particle manufacturing process to form the solid particles or precursors of the solid particles. An additional advantage of employing such spray drying is that the conditions of such step can be controlled so that the product solid particles are of a desired particle size or size range. The use of spray drying in such solid particle manufacturing is conventional and well known, and therefore need not be discussed in detail here. It is to be understood that the solid adsorbent and binder may be agglomerated and subjected to size reduction prior to forming the slurry, if desired.

The solid adsorbent and binder may be mixed in the slurry in a variety of proportions, whether as segregated or agglomerated particles, although it is generally desirable to use only as much binder as is required to give sufficient strength to the coated surface. It is preferred that the adsorbent portion comprises about 60 to 95 wt. % of the total weight of solids, i.e, adsorbent and binder, in the slurry and that the remaining 5 to 40 wt. % comprises binder. In addition to the adsorbent and binder, the slurry may contain a dispersing agent or surfactant to aid in suspending the particles or vary the viscosity of the slurry. Suitable surfactants include for example, Dispex, a salt of a polymeric carboxylic acid available from Allied Colloids, Suffolk, Va., and TSPP, a tetrasodium pyrophosphate available from Monsanto, St. Louis, Mo. When a surfactant or dispersing agent is used, it is preferred that its concentration be in the range of about 0.5 to 5.0 wt. % of the solids content of the slurry.

While it can be appreciated that the solid adsorbent and binder can be suspended in a dry slurry, i.e., fluidized bed, it is desirable in accordance with the present invention that the slurry contain a suspending liquid. The suspending liquid should be one which is not likely to chemically react, e.g., by itself or with the substrate or other components in the slurry. More preferably, the suspending liquid should be substantially non-reactive and should not interfere with the internal pores of the solid adsorbent. Water is a preferred suspending liquid for use according to the present invention. The proportion of suspending liquid can be varied to adjust the viscosity of the slurry and hence, the thickness of the coating. The determination of the appropriate proportions to achieve the desired coating thickness can be made experimentally by measuring the thickness resulting from a given slurry and then either increasing the solids proportion, i.e. higher viscosity, to obtain a thicker coating, or decreasing the solids proportion, i.e., lower viscosity, to obtain a thinner coating. One way to determine the thickness of the coating is to calculate the area density coverage, i.e., the weight of solid adsorbent per unit area, and then divide by the density of the solid adsorbent. It is generally preferred that the solid materials comprise about 10 to 40 wt. %, and preferably about 20 to 40 wt. % of the total weight of the slurry, and more preferably about 25 to about 35 wt. % of the slurry with the balance preferably consisting essentially of the suspending liquid and any surfactants or dispersing agents.

In order to ensure sufficient bonding of the solid adsorbent to the substrate, it is necessary to heat the surface of the substrate in an oxygen containing atmosphere, preferably containing at least about 1 mol % oxygen and more preferably consisting of air, to a temperature of at least 300° C., preferably between about 300–650° C. This heating preferably causes the surface of the substrate to become oxidized. While not wishing to be bound to any particular theory, it is suspected that the oxidation is at least partially responsible for achieving sufficient bonding.

The heated surface is then contacted with the slurry, preferably by dipping the surface into the slurry or by spraying the slurry onto the surface, to form a slurry-coated surface. In the case of coating the inside surface of a tube, it was found that heating the tube, stoppering one end of the tube, filling the tube with slurry and draining the tube after a period of time ranging from about 0.25 to 2 min., and preferably from about 0.5 to 1 min. provided an efficient method of uniformly coating the surface. If, after the initial contacting, it is desired to increase the thickness of the coating, additional contacting steps can be performed. When such additional contacting is performed, it is necessary to permit the coating to dry preferably in an oxygen containing atmosphere at a temperature of at least 100° C. for a period of at least 0.1 hours to preferably about 1 hour. It is preferred to preheat the coated surface to a temperature of about 300° C. before additionally contacting the surface with the slurry.

When the desired coating thickness has been obtained, the adsorbent coated surface is heated to a temperature and for a period of time sufficient to cause hardening of the coated surface. This temperature should be at least about 200° C., preferably between about 400° C. and 650° C., and most preferably between about 550–650° C. The time required to cause hardening of the coated surface is desirably at least 0.1 hours and less than about 1 hour.

The resulting adsorbent-substrate composite comprises an underlying metallic layer and another layer bonded to the surface of the metallic substrate consisting essentially of adsorbent and binder. These coatings provide a high surface area as well as a minimum diffusion path for the components adsorbed on the adsorbent and hence, superior rates of adsorption compared to pelleted or beaded forms of adsorbent. Moreover, the adsorbent coatings have excellent physical durability and are resistant to chipping and flaking. Furthermore, despite differences in the thermal expansion properties between the adsorbent and the metallic substrate, the adsorbent coatings of the present invention advantageously retain their physical integrity even after repeated thermal cycling. In addition, when the present invention is employed in heat transfer equipment, and the adsorbent layer has a uniform thickness ranging from 0.6 to 3.0 mm, and preferably ranging from 1.0 to 1.2 mm, the adsorbent coating provides an acceptably small thermal resistance. Without wishing to be bound to any particular theory, it is thought that the heating step performed prior to the contacting step, in addition to causing oxidation of the substrate, may change the grain structure of the substrate to advantageously provide improved bonding properties.

In accordance with the present invention, the adsorbents are partially applied to the inside surfaces of tubes for use in the cooling and heating by adsorption of a refrigerating fluid. The preferred tubes are thin-walled and may have a plurality of fins disposed on the outside surface of the tubes. The inside surface of the tube is coated with a thin layer of solid adsorbent between about 0.1 and less than 3 mm thick. Preferably, the layer of solid adsorbent, such as zeolite, has a uniform thickness of between about 0.6 and about 1.6 mm, and most preferably, the uniform thickness of the solid adsorbent layer is between about 1.0 and 1.2 mm. The coated tubes are typically evacuated to a high vacuum of at least 1 micron of mercury at a temperature of at least 350° C. for a period of at least about 2 to 4 hours, filled with a refrigerant, such as water, propane, butane, ammonia, $CO_2$, $SO_2$, sulfur hexafluoride, Refrigerant 11, Refrigerant 12, Refrigerant 21, and Refrigerant 22, light alcohols and mixtures thereof, and sealed in a closed system by either sealing both ends of the tube or by providing a closed refrigerant circuit comprising a reservoir, an evaporator, and a condenser.

Particularly with respect to FIG. 1A of the drawings, one embodiment of the desiccant cooling apparatus of the present invention is indicated generally at 10. The desiccant cooling apparatus 10 comprises a housing 16 having a first fluid inlet 14 and a first fluid outlet 18 and a second fluid inlet 20 and a second fluid outlet 22 and an interior 11. A plurality of partially zeolite-lined exchanger tubes 24 extend longitudinally within the interior of the housing. The tubes are aligned with each other and spaced to permit transverse fluid flow. Header plates 12 and 28 are disposed on each end of the tubes. A partition 40 divides the interior of the housing into a first zone and a second zone. The first zone is in fluid communication with the first fluid inlet and first fluid outlet for the flow of a first fluid therethrough. The second zone is in fluid communication with the second inlet and the second outlet to permit the flow of a second fluid therethrough. End cap 32 is disposed at the ends of the housing in sealing contact with the header plates defining a third zone which is in fluid communication with the interior space of the tubes. A valve 34, disposed on the end cap is in fluid communication with the third zone.

Figure 1B:
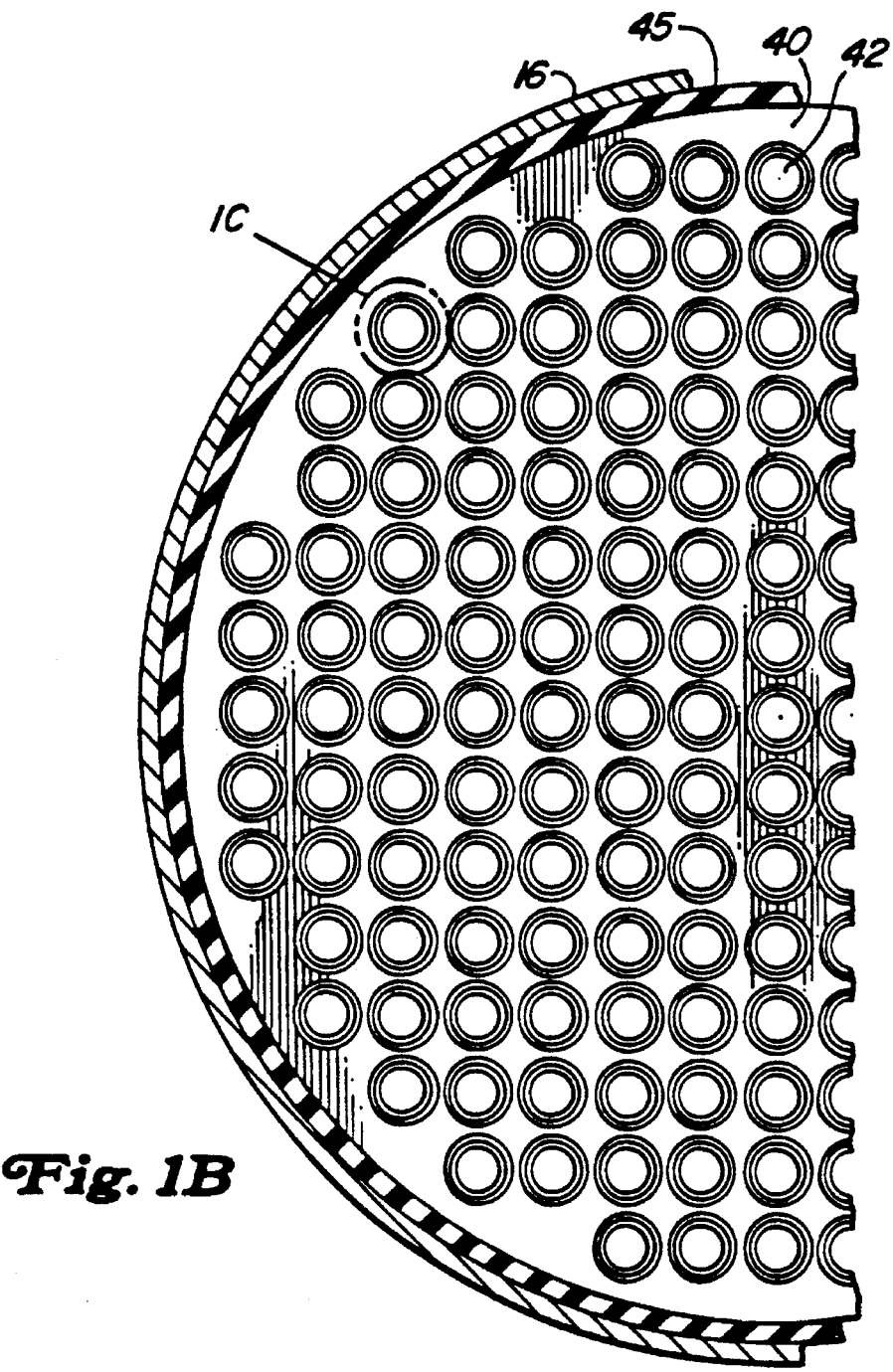

Referring to Figure 1B which is a detail of FIG. 1A, a partition 40 is shown at a point between the ends of the tubes. The partition and the header plates have a plurality of holes 42 for inserting the tubes therethrough and are aligned generally transverse to the tubes. The header plates 12, 28 and the partition 10 are disposed in sealing contact with the tubes.

Figure 1C:
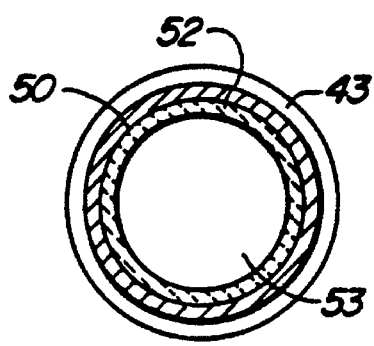

Referring to FIG. 1C which is a detail of Figure 1B, a view of a partially zeolite-lined tube is shown. A zeolite composition 52 is slip-coated, or bonded directly to the inside surface 50 of the partially zeolite-lined tube. The partially zeolite-lined tube has an interior space 53 containing a refrigerant. A sealing means 43 disposes the tubes in sealing contact with the header plates and the partition prevents fluid flow beyond the header plates or the partition. A second sealing means 45 disposed on the partition prevents fluid flow from one side of the partition to another. The portion of the partially zeolite-lined tube in the second zone has a bare tube surface (i.e., without the zeolite lining) to improve the heat transfer in the second zone.

Figure 2A:
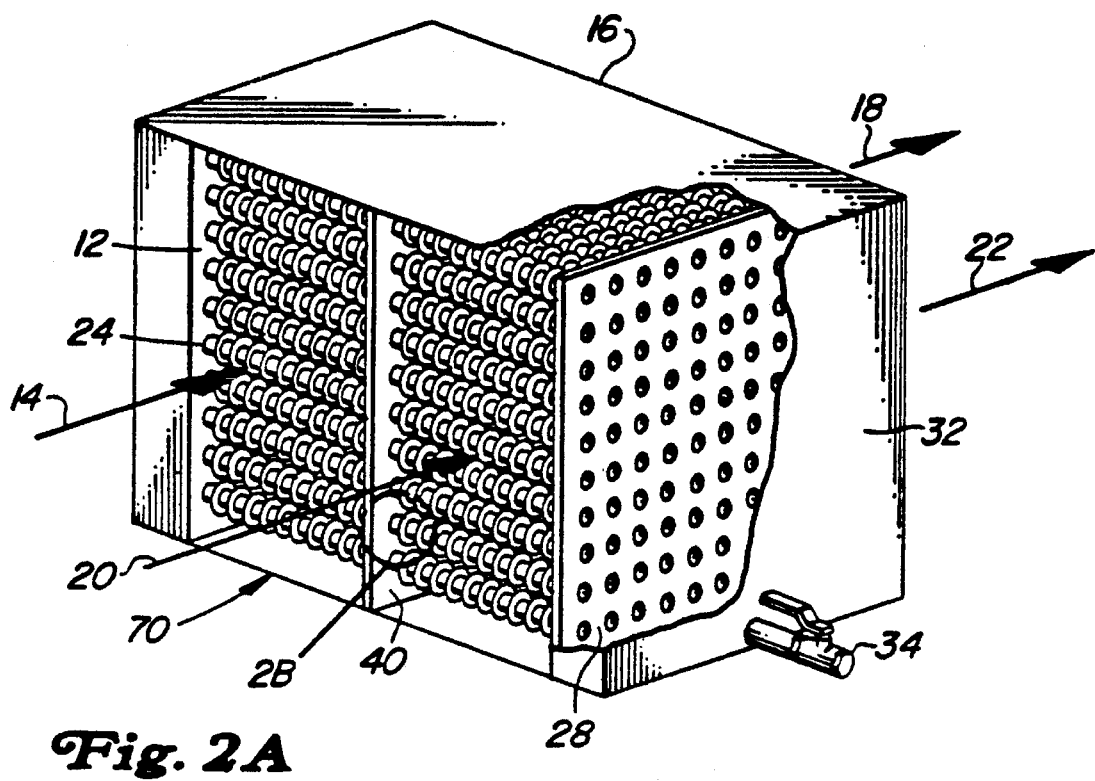
FIG. 2A is a diagrammatic illustration of a sorption cooling apparatus of the present invention for conditioning vapor streams, the housing being partially broken away to show FIG. 2B, a detail of the partially zeolite-lined tube and the partition.
Figure 2B:
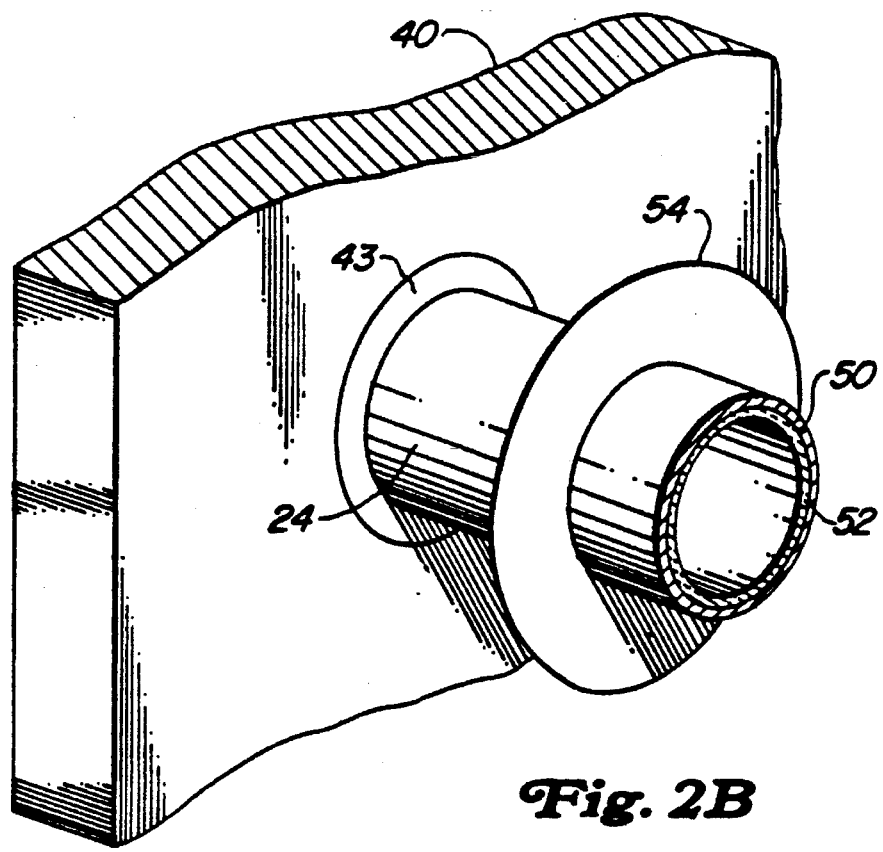

With respect to FIG. 2A, another embodiment of the desiccant cooling apparatus is shown at 70. The desiccant cooling apparatus is configured in a manner as described with respect to FIG. 1A with the overall shape of the apparatus arranged to permit vapor or gas flow through the first and second zones. Similar elements between FIGS. 1A, 1B, 1C and FIGS. 2A and 2B are shown with the same numbers. Fins 54 are shown disposed on the tubes in FIG. 2B.

A partially zeolite-lined tube may be employed in a heat pump or refrigeration cycle which operates between a hot fluid temperature and a cold fluid temperature. The solid adsorbent and refrigerant combination is selected according to those boundary conditions of the heat pump or refrigeration cycle, so that at least a portion of the refrigerant will be desorbed from the solid adsorbent at the hot fluid temperature and at least a portion of the refrigerant will be adsorbed at the cold fluid temperature. Preferably, the hot fluid temperature selected for the operation of the process will be relatively constant and range from about 80° C. to about 250° C. In the practice of the invention, the hot fluid may be an exhaust gas from any industrial process or an internal combustion engine. Generally, any fluid or gas stream at ambient conditions can be employed as the cold fluid. Preferably, the cold fluid temperature will be less than the hot fluid temperature and range from about 20° C. to about 50° C. Preferably, the lower desired temperature to which the feedstream is to be cooled will range from about 20° C. to about 0° C.

It is believed that the COP, or ratio of the cooling energy delivered to the energy input needed to drive the cooling cycle of the system, would be greater by having different thermal resistances in different zones of the sorption cooling apparatus. For example, for the two tube zone, the cooling apparatus described hereinabove with the first zone being an adsorber/generator zone and uniformly lined with adsorbent and with the second zone being a condenser/evaporator zone having bare surface or without lining, one can compare the COP of the device to one with a uniform lining adsorbent on the entire tube surface. At the operating conditions of a device for cooling air, the difference between the COP for the partially-lined zeolite tubes and the COP for the uniformly lined surface zeolite tubes shows about a 3.5 percent advantage to the partially-lined zeolite tube when the zeolite-lined surface portion is about equal to the bare surface portion. Preferably, the bare surface portion of the zeolite tube surface comprises from about 0.5 to about 50 percent of the entire tube surface.

The process of the invention to refrigerate a feedstream from an available temperature to a lower desired temperature will comprise a series of sequential steps. A first fluid at a hot fluid temperature is passed to a first zone of a desiccant cooling apparatus containing at least one partially zeolite-lined tube. The partially zeolite-lined tube has a first portion having a zeolite lining in the first zone and a second portion having a bare surface in a second zone of the desiccant cooling apparatus. The first portion of the partially zeolite-lined tube is prepared in the manner hereinabove and has a uniform lining of an adsorbent. The partially zeolite-lined tube has an inner space containing a refrigerant. The passing of the hot, first fluid on the outside of the partially zeolite-lined tube causes the refrigerant adsorbed thereon to be desorbed to produce a vaporized refrigerant stream. The vaporized refrigerant stream is passed to the second tube portion. Simultaneously, a second fluid at a second temperature, preferably at the cold fluid temperature is passed to the second zone of the desiccant cooling apparatus. In the second zone, the second fluid contacts the outside of the partially zeolite-lined tube, cooling the second portion of the partially zeolite-lined tube and resulting in the condensation of at least a portion of the refrigerant within the second portion of the partially zeolite-lined tube. These simultaneous steps are terminated at a point midway in the cycle. At this point the flows are switched such that the second cold fluid is passed to the first zone to heat the second fluid, thus removing heat from the first zone. Simultaneously, the feedstream to be cooled is passed to the second zone and the feedstream at the lower desired temperature is withdrawn. These later steps are terminated after a period of time and the cycle is complete. To provide continuous cooling, at least one other desiccant cooling apparatus may be operated with a cycle which is offset from the above cycle by at least one-half of the cycle. In an automobile, the at least one other desiccant cooling apparatus may be insulated from the first desiccant cooling apparatus and be contained within a common housing. In practice, the second fluid may be a portion of the feedstream which may be ambient air or a process stream comprising light hydrocarbons or air. Furthermore, it is within the scope of the present invention to separate the adsorption and generation sections of the process whereby the first zone contacting the first tube portion and the second tube portion are physically separated and refrigerant flows thereinbetween through any number of conduits and heat exchangers.

Furthermore, each solid adsorbent and refrigerant combination will have a saturation value which refers to the equilibrium amount of refrigerant which will be adsorbed by the solid adsorbent as the vapor pressure in equilibrium with the adsorbent approaches the saturation vapor pressure of the refrigerant at the adsorbent temperature. For example, a Zeolite 13X-water system has a saturation value from about 20% to about 28% weight of the zeolite. For the operation of the partially zeolite-lined tube, the tube is filled up to about 50% of the saturation value to permit at least half of the tube to operate in the hot fluid region and the remaining portion to operate in the cold fluid region. In this manner, desorption will take place at the hot fluid, or first end of the tube while adsorption and any condensation will take place at the cold fluid, or second end of the tube. Thus, for the Zeolite 13X-water system, about 50% of the saturation value of the zeolite layer is from about 10% to about 14% weight of the zeolite layer.

Therefore, in the process of preparing a partially zeolite-lined tube, following the activation of the zeolite layer by heating and evacuation for a sufficient time, the tube is cooled to an appropriate temperature and brought into equilibrium at an appropriate pressure with a refrigerant vapor such that the level of refrigerant vapor in the tube is up to about onehalf the saturation value of the zeolite layer. At this point the tube is sealed at the first and second ends, or the system is closed.

The outside surfaces of the tubes may be provided with fins or similar devices to facilitate the heat transfer between the shell side fluids and the refrigerant. Preferably, the tubes will be thin-walled and constructed of aluminum or similar high heat conductivity material with a low mass. Preferred high heat conductivity materials include aluminum, copper, steel, ceramics, glass, aluminized steels, and alloys thereof.

EXAMPLES

The following examples are provided for illustrative purposes and are not intended to limit the scope of the claims that follow.

EXAMPLE I

A low cerium rare earth exchanged Y-84 was prepared from zeolite Y-84. Y-84 is the ammonium form of stabilized Y zeolite with an $A_o$ of 24.55 Angstroms, an $NH_4/Al$ of 0.3 and a $Na/Al$ of less than 0.1. The Y-84 was obtained from UOP in Des Plaines, Ill. The Y-84 was subject to a rare earth chloride exchange with a mixed rare earth chloride salt containing 24.5 wt. % Lanthanium and 0.8 wt. % cerium. The material was water washed at a rate of 6 pounds of hot water per pound of Y-84. The product was subjected to calcining in dry air at a temperature of about 650° C. The resulting product had an $A_o$ of 24.51, a rare earth loading of about 5.5 wt.%, a $Si/Al_2O_3$ ratio of 5.2, an oxygen capacity of 28.1, a water capacity of 24.08 and a cerium content of less than 0.2 wt. % on a dry basis.

EXAMPLE II

The inside surface of a 12 inch length of copper tube, ¾" in diameter, was lined with the low cerium rare earth exchanged Y-84 adsorbent, Example I, according to the coating method of the present invention. The inside surface tube was sand blasted to clean the surface. The tube was heated to a temperature of about 300° C. in an oxygen containing atmosphere and one end of the tube was stoppered. A slurry with the following composition: 80% Adsorbent, 15% Kaolin and 5% Silica was poured into the tube. After about 1 minute, the stopper was removed and the slurry permitted to flow out of the tube. The solids content of the slurry was about 35 wt.% in water, the suspending liquid. No dispersion agent was added. It was found that the addition of the silica ($SiO_2$) to the binder was critical to obtaining a uniform bonding of the adsorbent to the inside surface of the copper tube. The coated tube was then dried in air at about 100° C. for about 1 hour. Following the drying step, the tube was preheated to a temperature of about 300° C., stoppered and refilled with slurry for about 1 minute. This procedure was repeated 4 times to obtain a uniform coating of adsorbent with a thickness of about 1.0 to 1.2 mm on the inside of the tube. On removing the slurry from the tube after the final coating, the tube was heated at about 550° C. for a period of about one hour to calcine the adsorbent and harden the adsorbent coating. It was found that preheating the tube between slurry applications improved the bonding. However, it was discovered that heating the clay above 500° C. between applications could convert the Kaolin to a metaKaolin structure which would prevent further application.

EXAMPLE III

A 12 inch length of a tube with an inside copper substrate was lined with zeolite Y-85 by following the method of the present invention and the procedure of Example II.

EXAMPLE IV

Figure 3:
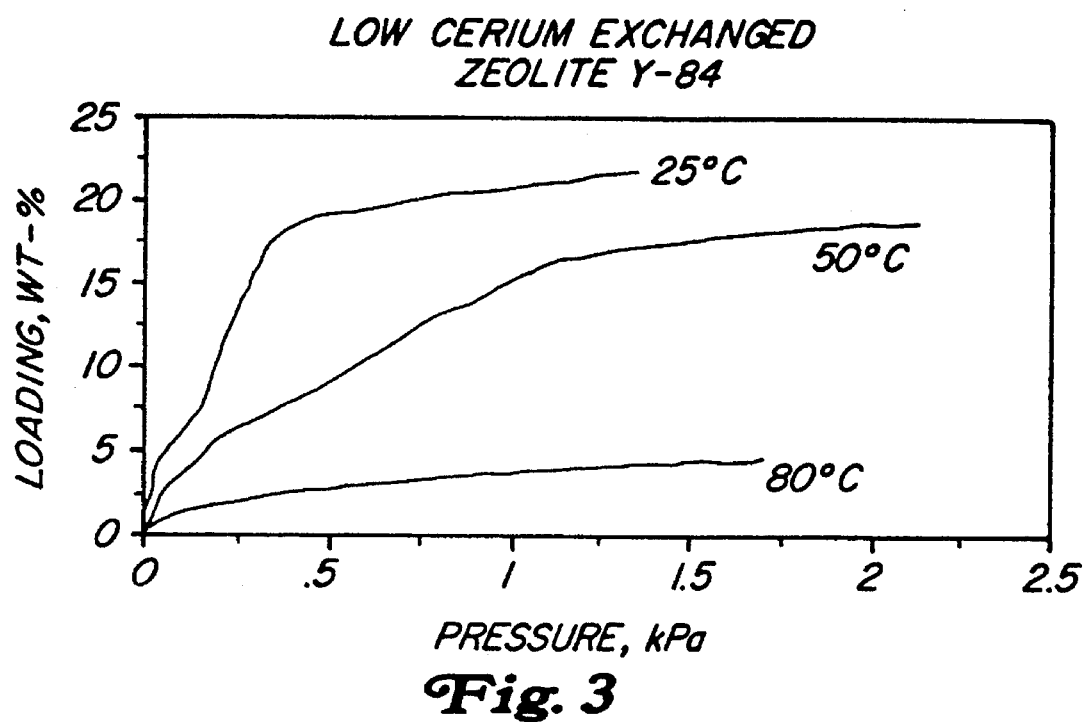
FIG. 3 is a graph of the ability of the sorbent, a low cerium rare earth exchanged zeolite Y-84 to adsorb water at various temperatures and known as an adsorption isotherm.
Figure 4:
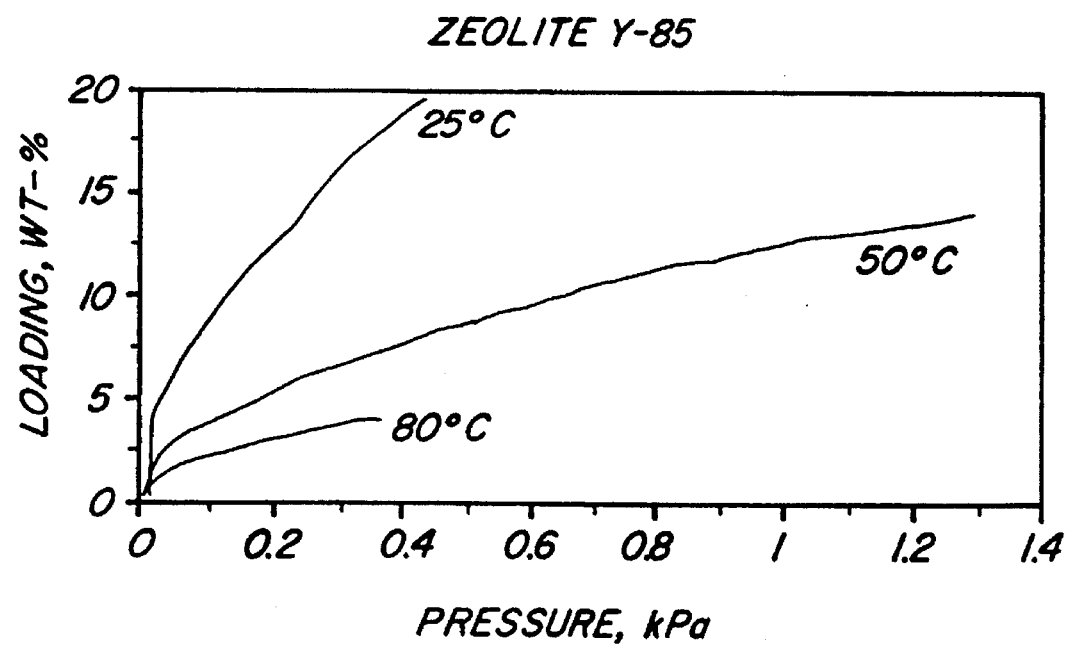
FIG. 4 is a graph similar to FIG. 3 for a zeolite Y-85 adsorbent.
Figure 5:
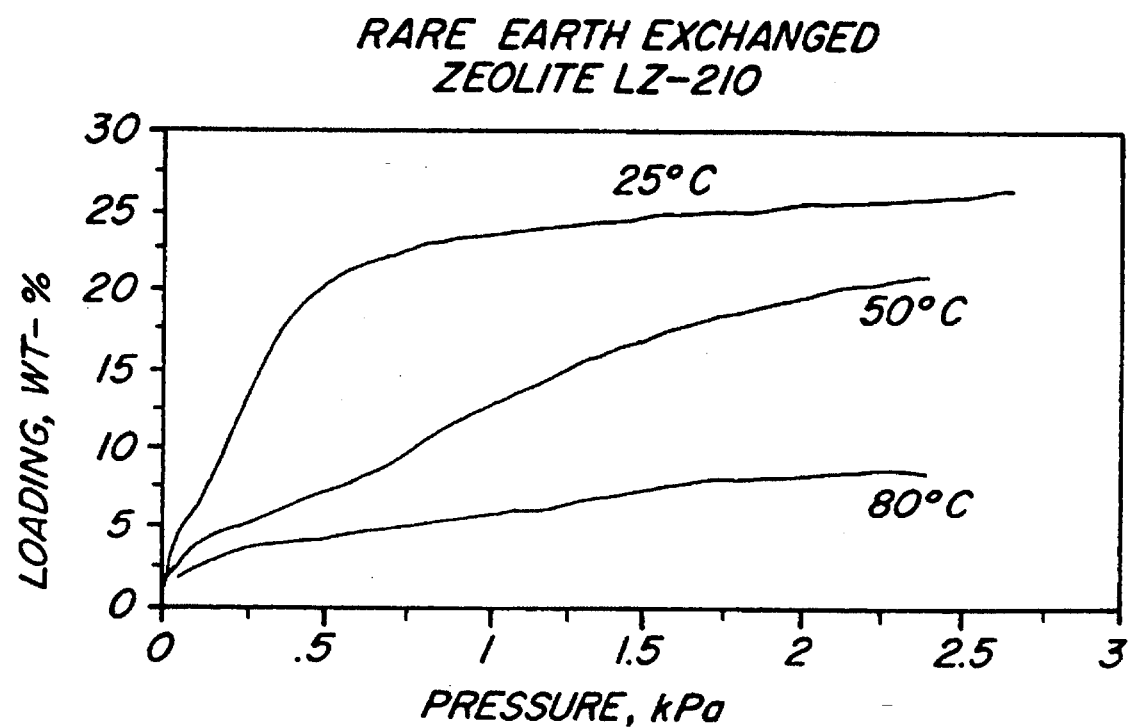
FIG. 5 is a graph similar to FIG. 3 showing the water isotherm for a rare earth exchange zeolite LZ-210 adsorbent.

A modified BET adsorption apparatus to measure the volumetric adsorption of an adsorbent was employed to produce an adsorption isotherm for the adsorbent coated tube. Temperature and pressure measurements in a vessel of known volume were made and a weight loading was calculated. The results were plotted as a function of pressure over a range from $10^{-6}$ torr to about 1 atmosphere. FIG. 3 presents the adsorption isotherms for the low cerium rare earth exchanged zeolite Y-84 and water developed at 25, 50, and 80° C. FIG. 4 presents adsorption isotherms for zeolite Y-85 and water at 25, 50, and 80° C. FIG. 5 presents the adsorption isotherms for a rare earth exchanged LZ-210 and water at and 80° C. A comparison of the delta loadings between 80° C. and 25° C. at a pressure of 0.5 kPa for these three adsorbents is shown in the Table 1 below:

TABLE 1

| DELTA LOADING WT % AT PRESSURE OF 0.5 kPa | | | |
|---|---|---|---|
| ADSORBENT | @ 80° C. | @ 25° C. | Δ LOADING, WT % |
| Y-85 | 4 | 20 | 16 |
| CRE-84 | 3 | 19 | 16 |
| RE-LZ210 | 4 | 20 | 16 |

The above adsorbents exhibit a similar tendency for the adsorption of water at ambient conditions and the desorption of water at the relatively low temperature of 80° C. with delta loadings of about 16 wt% between 25° C. and 80° C.

EXAMPLE V

A 12 inch portion of the inside surface of a 18 inch length of aluminum tube, ¾" in diameter, was lined with the calcined rare earth exchanged LZ-210 adsorbent according to the coating method disclosed hereinabove. The inside surface tube was sand blasted to clean the surface. The tube was heated to a temperature of about 100° C. in an oxygen containing atmosphere and the tube was spun at a rate of up to about 300 revolutions per minute. A slurry with the following composition: 80% Adsorbent, 7½% Kaolin, 7½% volclay and 5% silica as sodium silicate and about 1% TSPP was poured through the spinning tube. The solids content of the slurry was about 35 wt. % in water, the suspending liquid. The coated tube was then heated at about 550° C. for a period of about one hour to calcine the adsorbent and harden the adsorbent coating. It was found that spinning the tube prior to slurry application improved the uniformity of the coating and resulted in a desired adsorbent density of up to about 10 gm per foot of tubing, equivalent to a thickness of between 1.0 and about 2.0 mm, in a single contacting step.

EXAMPLE VI

An improvement to a sorption cooling device of the present invention in which the tubes are partially lined with a solid adsorbent such as zeolite may be made by having a portion of the tube being unlined and a portion being bare with the bare portion being in the condenser/evaporator zone. This Example VI compares the overall thermal efficiency of a uniformly coated tube having two zones of equal length wherein the first zone is in the adsorber/generator zone and the second zone is in the evaporator/condenser zone with a tube wherein the evaporator/condenser zone is bare. For a zeolite lined tube operating as a sorption cooling device of the present invention at a regeneration temperature of 93° C. (200° F.), an ambient temperature of 21° C., and delivering a treated air temperature of 10° C., and having an adsorbent delta loading of 15 wt%, a comparison of the relative COP's shows about a 3.5 percent advantage to the tube with bare surface in the condenser/evaporator or second zone.

EXAMPLE VII

Figure 6:
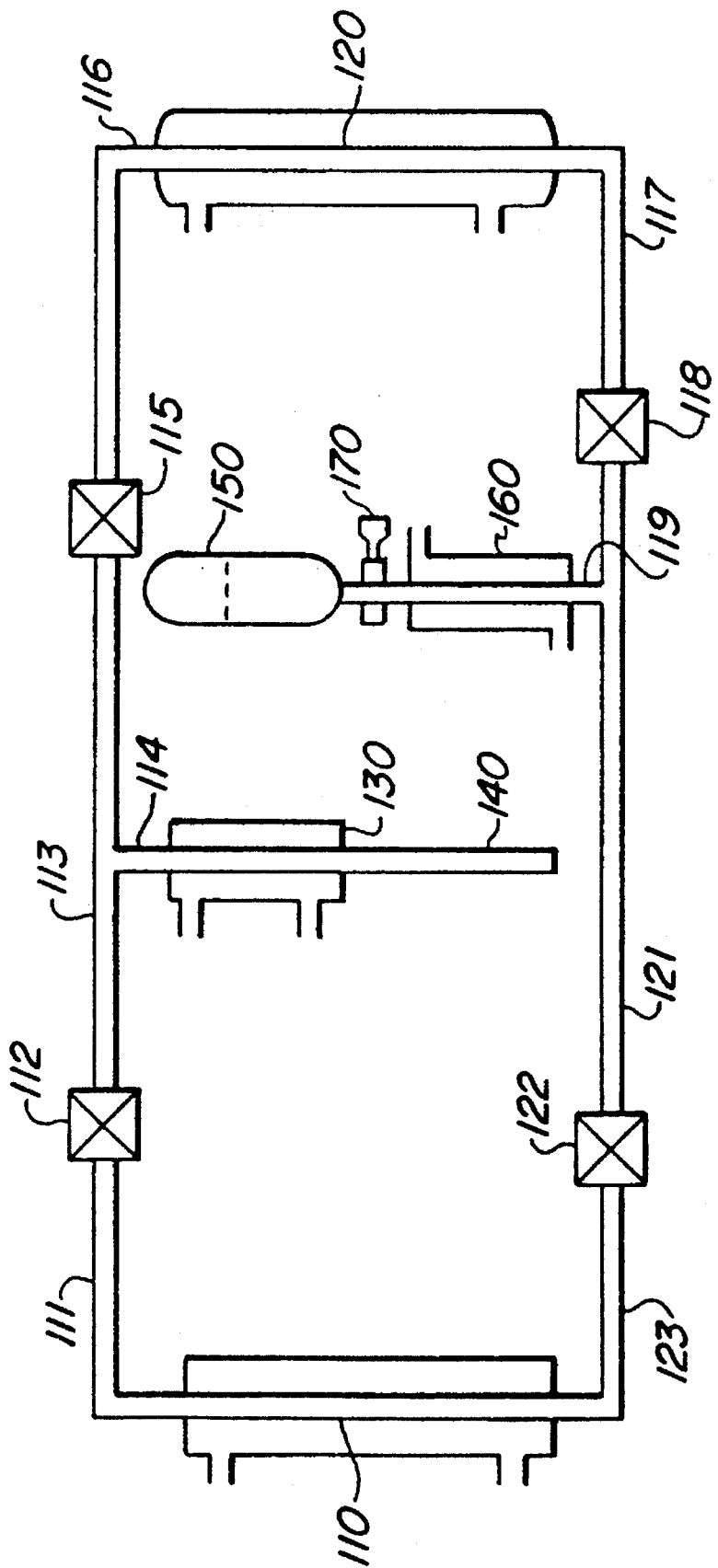
FIG. 6 is a schematic diagram of the sorption cooling apparatus of Example V.

The zeolite-lined tubes of Example II and Example III were used to construct two single tube, tube in shell, heat exchangers by enclosing the outside of the zeolite-lined tubes in separate steel jackets, each jacket having a fluid inlet and a fluid outlet. The zeolite-lined tubes, 110 and 120, were assembled as shown in FIG. 6 to operate in a sorption cooling process with water as the refrigerant. The major components of the process were the condensing heat exchanger 130, the condenser receiver 140, the evaporating heat exchanger 160 and the refrigerant reservoir 150. The condenser receiver was a 10 ml vial and the refrigerant reservoir was a calibrated vessel with a 50 ml capacity. The flow of water to the evaporating heat exchanger 160 was controlled by needle valve 170. The first zeolite-lined tube 110 was connected to the condensing heat exchanger 130 by line 111 valve 112 and lines 113 and 114. Similarly, the second zeolite-lined tube was connected to the condensing heat exchanger by line 116, valve 115 and lines 113 and 114. The first zeolite-lined tube is connected to the evaporating heat exchanger 160 by line 123, valve 122 and lines 121 and 119. The second zeolite-lined tube 120 by line 117, valve 118 and lines 121 and 119.

During the experiments, a heated fluid was supplied to one zeolite-lined tube while supplying ambient temperature fluid to the other tube. Ambient temperature fluid was continuously supplied to both the condensing heat exchanger and the evaporating heat exchanger. The experiments were begun with a full evaporator reservoir and an empty condenser receiver. One tube was activated at a regeneration temperature of about 80° C. while the other was brought to near a saturated state by exposure to the evaporator reservoir. The entire system was evacuated so that the total pressure of the system was in equilibrium with the adsorbent loading at ambient temperature. This value is approximately equal to the vapor pressure of water at the ambient temperature. The experimental cycle was begun by applying heated fluid at a per-selected regeneration or desorption temperature to the saturated tube, putting it in generation mode, while the activated tube was maintained at ambient temperature by cooling stream, putting this tube in the adsorber mode. After one-half the cycle time had elapsed, the heating and cooling streams and the valve settings were switched so that the tube which was in the generation mode was now in fluid communication with the evaporator, and the tube which was in the adsorber mode was put in fluid communication with the condenser and an amount of condensate was collected in the condenser receiver. The remainder of the cycle was carried out and the procedure was repeated until the receiver was full. The tubes were cycled between heating mode and cooling mode in a cycle that required a total time of about 6 minutes, equally divided between heating and cooling. The results of the experiments are summarized in Table 2. Each entry in Table 2 represents a separate run at increasing regeneration temperatures ranging from 65° C. to 96° C. below:

TABLE 2

| | Ave. Amt. of Water Condensed ml | Ave. Water Loading/ Cycle/Tube wt % | Regen Temp, °C. (Ave) | Evap Temp, °C. | Cooling Capacity BTU/ Hr/Ft$^3$ |
|---|---|---|---|---|---|
| A | 0.5 | 3.6 | 65 | 17.5 | 3761 |
| B | 0.63 | 4.5 | 70 | 16.5 | 4751 |
| C | 0.73 | 5.2 | 76.7 | 16.5 | 5496 |
| D | 0.76 | 5.4 | 80.7 | 14.5 | 5733 |
| E | 0.76 | 5.4 | 85.5 | 16.5 | 5737 |
| F | 0.78 | 5.4 | 85.5 | 15.8 | 5899 |
| G | 0.85 | 6.1 | 89.6 | 15.5 | 6406 |

=P The cooling capacity was derived from the amount of condensate adsorbed and the heat of vaporization of the refrigerant, water. The measured cooling capacities for the zeolite-line robes of the instant invention were at least twice that reported in the literature. The average overall heat transfer coefficient for the zeolite-lined robes was approximately 175 W/m$^2$/K.

I claim:

1. A desiccant cooling apparatus comprising:
   (a) a housing defining an interior, a partition dividing the interior of said housing into a first zone and a second zone, a first fluid inlet means and a first fluid outlet means in communication with said first zone and a second fluid inlet means and second fluid outlet means in communication with said second zone;
   (b) a plurality of partially zeolite-lined tubes extending longitudinally within said housing said tubes having a tube surface with a lined surface portion in said first zone and a bare surface portion in said second zone opposite and a first end and a second end opposite, said lined surface portion having an interior surface uniformly lined with a zeolite composition, said zeolite composition being bonded directly to said tube surface and defining an interior tube space containing a refrigerant, said tubes spaced to permit transverse fluid flow through said housing; and
   (c) means for sealing said first and second ends of said tubes.

2. The desiccant cooling apparatus of claim 1 wherein the zeolite composition comprises a low cerium mixed rare earth exchanged Y zeolite and a binder, having a uniform thickness of from 1.0 to 1.2 mm.

3. The desiccant cooling apparatus of claim 1 further comprising a plurality of fins disposed on the exterior of said partially zeolite-lined tubes.

4. The desiccant cooling apparatus of claim 1 wherein the bare surface portion comprises from about 0.5 to about 50 percent of said tube surface.

5. A process for sorption cooling to refrigerate a feed-stream from an initial temperature to a lower temperature comprising the following steps:
   (a) passing a first fluid at a first temperature to a first zone containing a first tube portion of a partially zeolite-lined tube having a tube surface, said first tube portion of said partially zeolite-lined tube having a uniform lining comprising zeolite defining an inner tube space containing a refrigerant, to desorb a portion of the refrigerant from said first tube portion of said partially zeolite-lined tube to produce a vaporized refrigerant stream therein, and passing said vaporized refrigerant stream to a second tube portion of said partially zeolite-lined tube having a bare tube surface;

(b) simultaneously passing a second fluid at a second temperature to a second zone to condense said vaporized refrigerant stream within said second tube portion of said partially zeolite-lined tube;

(c) terminating steps (a) and (b);

(d) passing said second fluid at said second temperature to said first zone to heat said second fluid to a third temperature;

(e) simultaneously passing said feedstream at the initial temperature to said second zone and withdrawing said feedstream at said lower temperature; and, (f) terminating the passing of said second fluid and said feedstream and repeating steps (a) to (e) to provide a sorption cooling cycle.

6. The process of claim 5 wherein the first temperature ranges from about 80° C. to about 250° C.

7. The process of claim 5 wherein the second temperature is lower than the first temperature.

8. The process of claim 5 wherein the initial temperature ranges from about 20° C. to about 50° C.

9. The process of claim 5 wherein a single partially zeolite-lined tube provides said first tube portion of a partially zeolite-lined tube and said second portion of a partially zeolite-lined tube.

10. The process of claim 5 wherein the lower temperature of said feedstream ranges from about 20° C. to about 0° C.

11. The process of claim 5 wherein the uniform lining comprising zeolite in said first tube portion ranges between 1.0 and 1.2 mm in thickness.

12. The process of claim 5 wherein steps (a) and (b) consume at least one-half of said sorption cooling cycle.

13. The process of claim 12 wherein said first zone and said second zone are located in a first desiccant cooling apparatus and at least one other desiccant cooling apparatus operated according to the sorption cooling cycle of steps (a) through (f) and offset by at least one-half of said sorption cooling cycle is provided to continuously cool said feedstream.

14. The process of claim 5 wherein the second fluid is a portion of said feedstream.

15. The process of claim 5 wherein said feedstream is selected from the group consisting of a light hydrocarbon stream and air.

16. The process of claim 5 wherein said first zone containing said first tube portion and said second zone containing said second tube portion of said partially zeolite-lined tube are physically separated and refrigerant flows thereinbetween.

17. The process of claim 5 wherein said sorption cooling cycle ranges from about 0.01 to about 1 hour.

18. The process of claim 5 wherein said second portion of said partially zeolite-lined tube comprises from about 0.5 to about 50 percent of said tube surface.

19. The process of claim 5 wherein said zeolite is selected from the group consisting of zeolite Y-54, zeolite Y-85, a low cerium rare earth exchanged Y-84, and a rare earth exchanged LZ-210.

* * * * *